US010988617B2

(12) United States Patent
McClellan, Jr. et al.

(10) Patent No.: US 10,988,617 B2
(45) Date of Patent: *Apr. 27, 2021

(54) HYBRID COMPOSITION AND METHOD FOR THE REPAIR AND MAINTENANCE OF ASPHALT AND CONCRETE SURFACEWAYS

(71) Applicant: DeWitt Products Company, Detroit, MI (US)

(72) Inventors: Jack D. McClellan, Jr., Detroit, MI (US); Carl D. Hayes, Detroit, MI (US)

(73) Assignee: DEWITT PRODUCTS COMPANY, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,204

(22) Filed: Aug. 18, 2020

(65) Prior Publication Data
US 2020/0377731 A1 Dec. 3, 2020

Related U.S. Application Data

(63) Continuation of application No. 16/401,881, filed on May 2, 2019, now Pat. No. 10,808,126.

(60) Provisional application No. 62/665,807, filed on May 2, 2018.

(51) Int. Cl.
| C08L 95/00 | (2006.01) |
| C08K 3/04 | (2006.01) |
| C08K 3/34 | (2006.01) |
| C08K 3/013 | (2018.01) |
| C08K 7/14 | (2006.01) |
| C08K 5/01 | (2006.01) |
| C08L 67/00 | (2006.01) |
| C08L 21/00 | (2006.01) |

(52) U.S. Cl.
CPC ............ *C08L 95/005* (2013.01); *C08K 3/013* (2018.01); *C08K 3/04* (2013.01); *C08K 3/34* (2013.01); *C08K 5/01* (2013.01); *C08K 7/14* (2013.01); *C08L 21/00* (2013.01); *C08L 67/00* (2013.01); *C08L 2201/52* (2013.01); *C08L 2555/52* (2013.01); *C08L 2555/54* (2013.01); *C08L 2555/74* (2013.01); *C08L 2555/80* (2013.01)

(58) Field of Classification Search
CPC .... C08L 95/00; C08L 95/005; C08L 2201/52; C08L 2205/03; C08L 2555/52; C08L 2555/54; C08L 2555/74; C08L 2555/80; C09D 191/00; E01C 11/005; C08K 3/04; C08K 3/34; C08K 5/01; C08K 7/14; C08K 3/013; C04B 28/00
See application file for complete search history.

(56) References Cited

U.S. PATENT DOCUMENTS

2016/0075877 A1 * 3/2016 Kaiser ................ B29C 48/40
277/316

FOREIGN PATENT DOCUMENTS

WO   WO-2014173513 A1 * 10/2014 ............ B29C 48/02

* cited by examiner

Primary Examiner — Christopher M Rodd
(74) Attorney, Agent, or Firm — Burris Law, PLLC

(57) ABSTRACT

A sealant material composition for sealing asphalt includes a non-fiber asphalt emulsion between about 20.0 wt. % and about 60.0 wt. %, carbon black between about 0.5 wt. % and about 5.0 wt. %, an aggregate between about 1.0 wt. % and about 10.0 wt. %, wherein the aggregate is amorphous aluminum silicate, and a hydrophobic additive between about 0.1 wt. % and about 1.0 wt. %.

20 Claims, 3 Drawing Sheets

2-Day Cure
Average Number of Cycles: 5,600

7-Day Cure
Average Number of Cycles: >8,200

2-Day Cure
Average Number of Cycles: 3,100

7-Day Cure
Average Number of Cycles: 6,200

HYBRID COMPOSITION AND METHOD FOR THE REPAIR AND MAINTENANCE OF ASPHALT AND CONCRETE SURFACEWAYS

CROSS-REFERENCE TO RELATED APPLICATIONS

This application is a continuation of U.S. application Ser. No. 16/401,881, filed on May 2, 2019, which claims priority to and the benefit of U.S. Application No. 62/665,807 filed on May 2, 2018. The disclosures of the above applications are incorporated herein by reference.

FIELD

The present disclosure relates to materials and methods of application in the maintenance, preservation, and repair of asphalt and concrete surfaces such as roads, parking lots, and bridge deck surfaces.

BACKGROUND

The statements in this section merely provide background information related to the present disclosure and may not constitute prior art.

Modern asphalt and concrete surfaces are designed for high durability and are under increasing service life demands. Elements such as the weather, road salt, and traffic, among others, contribute to deterioration of asphalt and concrete surfaces. Such deterioration can ultimately result in damage such as cracks, holes, voids, i.e., "pot holes." Moreover, non-road surfaces such as driveways, parking lots, and the like can have cracks, holes, and other discontinuities that are unaesthetic and "rough" to drive over.

Many compositions for the maintenance, preservation, sealing, and repair of asphalt and concrete surfaces have been used in the past. However, due to differences in thermal expansion and limited adhesion, these compositions expand and contract extensively due to changes in weather/temperature conditions. In some cases, the expansion and contraction facilitate the introduction of water/moisture beneath the repair and surrounding surfaces. This moisture can be the cause of cracks and "potholes," which can ultimately lead to damage to vehicles traversing the surfaces, especially at higher speeds.

Replacing concrete or asphalt structure is time consuming, expensive, and renders the structure temporarily unusable. Also, sealants, especially for driveways and parking lots, have a limited life such that removal and repair is required on an annual or semi-annual basis.

The present disclosure addresses issues related to improved maintenance, preservation, sealing, and repair of asphalt and concrete surfaces.

SUMMARY

In a form of the present disclosure, a sealant material composition for sealing asphalt or concrete is provided. The sealant material composition comprises a non-fiber asphalt emulsion between about 20.0 wt. % and about 60.0 wt. %, carbon black between about 0.5 wt. % and about 5.0 wt. %, an aggregate of essentially amorphous aluminum silicate between about 1.0 wt. % and about 10.0 wt. %, and a hydrophobic additive between about 0.1 wt. % and about 1.0 wt. %.

In one variation, the non-fiber asphalt emulsion is between about 30.0 wt. % and about 50.0 wt. %, the carbon black is between about 1.0 wt. % and about 4.0 wt. %, the aggregate comprises amorphous aluminum silicate between about 2.5 wt. % and about 7.5 wt. %, and the hydrophobic additive is between about 0.25 wt. % and about 0.75 wt. %.

Another form comprises non-fiber asphalt emulsion between about 35.0 wt. % and about 45.0 wt. %, carbon black between about 1.5 wt. % and about 3.0 wt. %, aggregate comprising amorphous aluminum silicate between about 4.0 wt. % and about 6.0 wt. %, and the hydrophobic additive is between about 0.4 wt. % and about 0.6 wt. %.

In a form, the sealant material composition comprises non-fiber asphalt emulsion at about 40.0 wt. %, carbon black at about 2.0 wt. %, aggregate comprising amorphous aluminum silicate at about 5.0 wt. %, and hydrophobic additive at about 0.5 wt. %.

Other aspects further comprise a diluent between about 25.0 wt. % and about 75.0 wt. %, while in other forms the diluent is between about 40.0 wt. % and about 60.0 wt. %, and in another specific form the diluent is about 52.0 wt. %.

In another form of the present disclosure, a sealant material composition for sealing asphalt or concrete is provided. The sealant material composition comprises a non-fiber asphalt emulsion between about 20.0 wt. % and about 60.0 wt. %, carbon black between about 0.5 wt. % and about 5.0 wt. %, an aggregate of essentially amorphous aluminum silicate between about 1.0 wt. % and about 10.0 wt. %, and a coalescent between about 0.01 wt. % and about 0.5 wt. %.

In one variation, the non-fiber asphalt emulsion is between about 30.0 wt. % and about 50.0 wt. %, the carbon black is between about 1.0 wt. % and about 4.0 wt. %, the aggregate comprises amorphous aluminum silicate between about 2.5 wt. % and about 7.5 wt. %, and the coalescent is between about 0.05 wt. % and about 0.3 wt. %.

Another form comprises non-fiber asphalt emulsion between about 35.0 wt. % and about 45.0 wt. %, carbon black between about 1.5 wt. % and about 3.0 wt. %, aggregate comprising amorphous aluminum silicate between about 4.0 wt. % and about 6.0 wt. %, and coalescent between about 0.075 wt. % and about 0.2 wt. %.

In a form, the sealant material composition comprises non-fiber asphalt emulsion at about 40.0 wt. %, carbon black at about 2.0 wt. %, aggregate comprising amorphous aluminum silicate at about 5.0 wt. %, and coalescent at about 0.1 wt. %.

Other aspects further comprise a diluent between about 25.0 wt. % and about 75.0 wt. %, while in other forms the diluent is between about 40.0 wt. % and about 60.0 wt. %, and in another specific form the diluent is about 52.0 wt. %.

In a further form of the present disclosure, a sealant material composition for sealing asphalt or concrete is provided. The sealant material composition comprises a non-fiber asphalt emulsion between about 20.0 wt. % and about 60.0 wt. %, carbon black between about 0.5 wt. % and about 5.0 wt. %, a hydrophobic additive between about 0.1 wt. % and about 1.0 wt. %, and a coalescent between about 0.01 wt. % and about 0.5 wt. %.

In one variation, the non-fiber asphalt emulsion is between about 30.0 wt. % and about 50.0 wt. %, the carbon black is between about 1.0 wt. % and about 4.0 wt. %, the hydrophobic additive is between about 0.25 wt. % and about 0.75 wt. %, and the coalescent is between about 0.05 wt. % and about 0.3 wt. %.

Another form comprises non-fiber asphalt emulsion between about 35.0 wt. % and about 45.0 wt. %, carbon black between about 1.5 wt. % and about 3.0 wt. %, hydrophobic additive between about 0.4 wt. % and about 0.6 wt. %, and coalescent between about 0.075 wt. % and about 0.2 wt. %.

In a form, the sealant material composition comprises non-fiber asphalt emulsion at about 40.0 wt. %, carbon black at about 2.0 wt. %, hydrophobic additive at about 0.5 wt. %, and coalescent at about 0.1 wt. %.

Other aspects further comprise a diluent between about 25.0 wt. % and about 75.0 wt. %, while in other forms the diluent is between about 40.0 wt. % and about 60.0 wt. %.

Advantageously, in at least one form of the present disclosure, the patch material composition is used to repair an asphalt or concrete surface such as a roadway, and the sealant material composition is used to seal and beautify an asphalt or concrete surface such as a parking lot.

Various methods of mixing and applying the composite material composition are also provided, in which the composition is applied in a heated or hot form.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
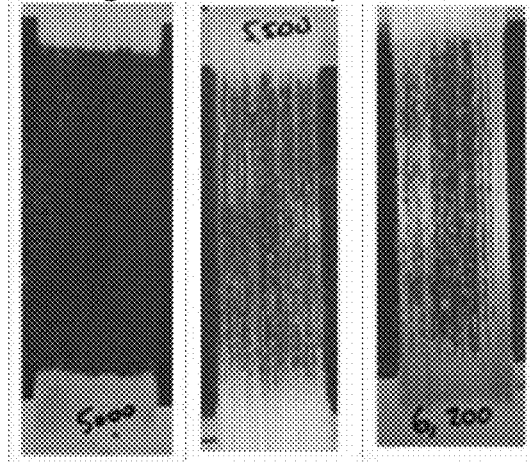
FIG. 1A is a series of photographs for steel panels coated with a refined coal tar-based pavement sealer and subjected to scrub testing after a 2-day cure and a 7-day cure.
Figure 1A:
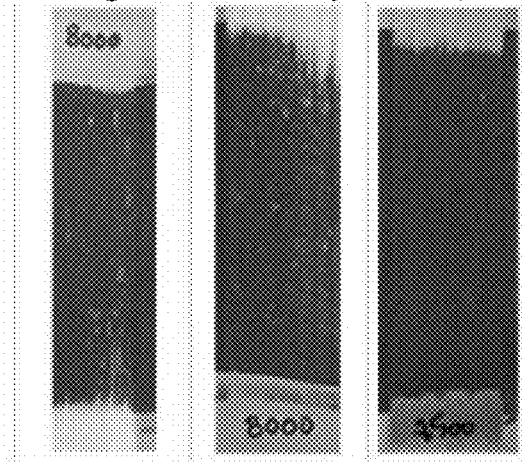

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To address the issues related to maintenance, preservation, sealing, and repair of asphalt and concrete surfaces, the inventors have discovered composite material compositions that can be applied to such surfaces. In one form of the present disclosure, the composite material composition is for patching asphalt and/or concrete surfaces (referred to herein as a "mastic" or "patch material composition") and includes three primary components: 1) a concentrate; 2) an aggregate; and 3) reinforcements, which are described in greater detail below. In another form of the present disclosure the composite material composition is for sealing asphalt and/or concrete surfaces (referred to herein as a "sealer" or "sealant material composition") and is described in greater detail below.

Patch Material Composition

When heated, the patch material composition is pourable. When cooled, the patch material composition provides a durable, highly adhesive, flexible and non-tacky material enabled to repair various asphalt and concrete surfaces. The patch material composition of the present disclosure is engineered to cure to a durable, impact resistant, and load-bearing object (also referred to herein as a "patch") with a non-tacky finish that can be used in various environments. Further, the patch material composition provides improved sound attenuation and surface finish while readily adhering to surfaces such as asphalt, concrete, and the like.

The concentrate of the patch material composition comprises asphalt, mineral filler, distillates, vulcanized rubber compounds, and polyester fibers. In one form, the concentrate at application temperatures is a pourable polymer modified binder. The concentrate has various formulations depending upon the desired applications, which range from decorative art to highly engineered Department of Transportation (DOT) road grade specified binders. The inventors have found desirable results in the range of about 25.0 wt. % to about 75.0 wt. % concentrate, with an alternate range in an amount between about 30.0 wt. % and about 60.0 wt. % concentrate.

Asphalt (Chemical Abstracts Service (CAS) Number: 8052-42-4) in the concentrate is a dark bituminous substance that is found in natural beds and is also obtained as a residue in petroleum refining and that consists chiefly of hydrocarbons. Asphalt also refers to an aqueous substance commonly used in road and roofing construction and includes any asphalt bottoms fraction, as well as naturally occurring asphalts, tars and pitches. The inventors have found desirable results in the range of about 25.0 wt. % to about 95.0 wt. % asphalt.

Mineral fillers in the concentrate are used to provide an additional reinforcement of a dried sealer membrane. Mineral filler is a mineral material, inert to the other components of the asphalt or concrete mixture. Mineral filler is finely divided with at least 65% passing a sieve opening of a 0.075 mm square mesh. But, because of the small size of the particles and their surface characteristics, the mineral filler acts as an active material, manifested in the interface filler/asphalt binder properties. The mineral filler is a material consisting of mineral particles from the coarse and/or fine aggregates employed in the asphalt mixture or from other sources such as limestone powder, hydrated lime, Portland cement, pumice, diamond, corundum, topaz, quartz, orthoclase oeldspar, apatite, fluorite, calcite, gypsum, and talc, among others. Generally, mineral filler improves the rheological, mechanical, and thermal behavior and water susceptibility of asphalt mixtures. Mineral filler also occupies the spaces between coarse and fine aggregates, modifying numerous material properties such as aging resistance, water resistance, and workability. Generally, the patch material composition of the present disclosure may include mineral fillers in the range of up to about 75.0 wt. %, with an alternate range in an amount between about 2.0 wt. % and about 30.0 wt. %. In some aspects of the present disclosure, the patch material composition includes a mineral filler in the range of about 2.0 wt. % to about 15.0 wt. % mineral filler. In other aspects of the present disclosure, the patch material composition includes a mineral filler in the range between about 2.0 wt. % and about 10.0 wt. %. In still other aspects, the patch material composition includes a mineral filler in the range between about 5.0 wt. % and about 20.0 wt. %. For example, patch material compositions of the present disclosure have achieved desired material properties with a mineral filler at about 2.5 wt. %, about 5.0 wt. %, about 10.0 wt. %, and about 15.0 wt. %.

Distillates in the concentrate are petroleum solvents used for dissolving binders. As the volatility of the distillate increases the solvent evaporates quicker; similarly, as the volatility of the distillate decreases the solvent evaporates slower. Based on relative speed of evaporation, asphalts are divided into three types: 1) Rapid Curing (RC); 2) Medium-Curing (MC); and 3) Slow-Curing (SC). RC asphalts are a mixture of asphalt and a light distillate (volatile solvent) with a boiling point generally in the range of gasoline or naphtha. MC asphalts are a mixture of asphalt and a medium distillate (intermediate volatility) with a boiling point generally in the range of kerosene. SC asphalts are a mixture of asphalt and a heavy (oily) distillate of (low volatility). The degree of fluidity (viscosity) for each type of asphalt depends on the grade of asphalt cement, volatility of the solvent, and proportion of solvent to binder. Also, the degree of fluidity results in several grades of asphalt. Generally, the patch material composition of the present disclosure may include a distillate in the range of up to about 30.0 wt. %, with an alternate range in an amount between about 2.0 wt. % and about 30.0 wt. %. In some aspects of the present disclosure, the patch material composition includes a distillate the range of about 2.0 wt. % to about 15.0 wt. % mineral filler. In other aspects of the present disclosure, the patch material composition includes a mineral filler in the range between about 1.0 wt. % and about 15.0 wt. %. In still other aspects, the patch material composition includes a mineral filler in the range between about 10.0 wt. % and about 20.0 wt. %. For example, patch material compositions of the present disclosure have achieved desired material properties with a hydrotreated heavy naphthenic (HHN, CAS Number: 64742-52-5) distillate at about 2.5 wt. %, about 5.0 wt. %, about 10.0 wt. %, and about 15.0 wt. % HHN distillate.

Rubber in the concentrate absorbs impacts on asphalt and concrete surfaces improving the quality of a vehicle ride and reducing wear and tear on vehicle components (e.g. shocks, struts). Rubber also absorbs the sound of impacts on asphalt and concrete surfaces, thereby reducing traffic noise (sound attenuation). In some aspects of the present disclosure, rubber is included as de-vulcanized rubber. In other aspects of the present disclosure, rubber is included as vulcanized rubber which can be created by grinding tires into crumb rubber. Usually, the tires would otherwise be discarded or occupy landfills as the tires are at the end of their service life (bald, punctured). The vulcanized rubber is dry, fine, and generally free of foreign particulates (metal, fiber), enabling its use in a wide range of advanced products. Vulcanized rubber is an inexpensive, high-performance, sustainable raw material that replaces oil- and rubber-based materials. Generally, the patch material composition of the present disclosure may include vulcanized rubber in the range of up to about 40.0 wt. %, with an alternate range in an amount between about 2.0 wt. % and about 30.0 wt. %. In some aspects of the present disclosure, the patch material composition includes vulcanized rubber the range of about 2.0 wt. % to about 30.0 wt. % mineral filler. In other aspects of the present disclosure, the patch material composition includes vulcanized rubber in the range between about 1.0 wt. % and about 15.0 wt. %. In still other aspects, the patch material composition includes vulcanized rubber in the range between about 10.0 wt. % and about 30.0 wt. %. For example, patch material compositions of the present disclosure have achieved desired material properties with vulcanized rubber at about 2.5 wt. %, about 5.0 wt. %, about 10.0 wt. %, and about 15.0 wt. % vulcanized rubber.

Fibers in the concentrate improve numerous material properties of the concentrate including ductility, durability, rutting resistance, stiffness, and cost. Rutting is the tendency of a surface to form ruts (e.g. depressions, grooves, holes) due to forces such as erosion or wear. The erosion may be loss of material above (e.g. rainwater, traffic) or below (e.g. drilling, inadequate foundation) the surface. Fibers in the concentrate may include fiber formed from aramid, basalt, carbon, ceramics, glass, metals, and polymers. In some aspects of the present disclosure the fibers are polyester fibers (CAS Number: 25038-59-9). Generally, the patch material composition of the present disclosure may include fibers in the range of up to about 10.0 wt. %, with an alternate range in an amount between about 2.0 wt. % and about 8.0 wt. %. In some aspects of the present disclosure, the patch material composition includes fibers, e.g., polyester fibers, in the range of about 1.0 wt. % to about 8.0 wt. %. In other aspects of the present disclosure, the patch material composition includes fibers in the range between about 6 wt. % and about 10.0 wt. %. For example, patch material compositions of the present disclosure have achieved desired material properties with fibers at about 0.05 wt. %, about 0.1 wt. %, about 3.0 wt. %, and about 6 wt. %.

Aggregate in the patch material composition serves as reinforcement to add strength to the asphalt or concrete. The aggregate is a fine- to coarse-grained particulate material used in construction, including Amorphous Aluminum Silicate (AAS, pumice, CAS Number: 1332-09-8), crushed stone, geosynthetic aggregates, gravel, recycled concrete, sand, and slag. In some aspects of the present disclosure, the aggregate is AAS and the AAS is in granule form such that it is suspended in the patch material composition. In some aspects of the present disclosure, the Generally, the patch material composition of the present disclosure may include aggregate in the range of about 2.0 wt. % to about 70.0 wt. %, with an alternate range in an amount between about 10.0 wt. % and about 70.0 wt. %. In some aspects of the present disclosure, the patch material composition includes aggregate, e.g., AAS, in the range of about 15.0 wt. % to about 65.0 wt. %. In other aspects of the present disclosure, the patch material composition includes aggregate in the range between about 2.0 wt. % and about 15.0 wt. %. In still other aspects of the present disclosure, the patch material composition includes aggregate in the range between about 30.0 wt. % and about 60.0 wt. %. For example, patch material compositions of the present disclosure have achieved desired material properties with aggregate at about 2.5 wt. %, about 5.0 wt. %, about 28.9 wt. %, and about 60.0 wt. %.

Reinforcements in the patch material composition perform similar functions as the fiber reinforcements in the concentrate as described above, except the reinforcements are more of a macroscopic reinforcement. In some aspects of the present disclosure, the reinforcements are glass fibers, for example and without limitation, non-respirable continuous filament glass fibers (CAS Number: 65997-17-3 with a softening point greater than 800° C. (1500° F.), and a density of 2.6 g/cm$^3$). Generally, the patch material composition of the present disclosure may include reinforcements in the range of up to about 5.0 wt. %, In some aspects of the present disclosure, the patch material composition includes reinforcements, e.g., non-respirable continuous filament glass fibers, in the range of about 0.01 wt. % to about 0.4 wt. %. In other aspects of the present disclosure, the patch material composition includes reinforcements in the range between about 0.05 wt. % and about 0.3 wt. %. In still other aspects of the present disclosure, the patch material composition includes reinforcements in the range between about 0.075 wt. % and about 0.2 wt. %. For example, patch material compositions of the present disclosure have achieved desired material properties with reinforcements at abut 0.1 wt. %.

A summary of the patch material compositions is provided below in Table 1.

TABLE 1

| | Exemplary Range 1 | | | |
|---|---|---|---|---|
| | min (wt. %) | max (wt. %) | min (wt. %) | max (wt. %) |
| Ingredient | Concentrate | | 25 | 75 |
| Asphalt | 25 | 95 | | |
| Mineral Filler | 0 | 75 | | |
| Distillate | 0 | 30 | | |
| Rubber | 0 | 25 | | |
| Polyester Fiber | 0 | 10 | | |
| Aggregate | | | 5 | 70 |
| Reinforcements | | | 0 | 8 |

Exemplary Application of the Patch Material Composition

The bond strength, durability, and other material properties when the patch material composition of the present disclosure is applied are influenced by several factors such as cold temperatures, debris, and moisture, as such a clean, dry and warm surface improves material properties. A clean surface is as free as possible of any debris (e.g. dirt, dust, grease, loose materials, among others) and any other material that could diminish bonding.

A dry surface is enabled by numerous drying methods, including the use of a brush, heat lance (i.e. hot air lance), or the sun. In a heat lance, a combustion system mixes compressed air and gas (e.g., liquified petroleum gas (LPG) or liquified natural gas (LNG)) to create high velocity hot air. For example, heat lances can generate temperatures above 425° C. (800° F.), often above 1650° C. (3000° F.). Accordingly, heat lances can remove moisture and debris from surfaces such that heat lancing discontinuities (e.g., cracks, ruts) provides dry dean surfaces for the application of the patch material composition disclosed herein.

In some aspects of the present disclosure, the patch material composition of the present disclosure is heated in a jacketed (e.g. air, oil, or water) double boiler kettle (e.g. KM International: KM 55 Rubber Melting Kettle) enabled to evenly suspend the aggregate during operation. In some aspects, the patch material composition is heated in a jacketed double boiler kettle in the range of about 171° C. (340° F.) to about 205° C. (400° F.), with an alternate range of about 176° C. (350° F.) to about 199° C. (390° F.), prior to application onto an asphalt and/or concrete surface. Also, the patch material composition of the present disclosure can be agitated during application, heating, and installation.

The patch material composition of the present disclosure is self-adhesive and develops a strong bond to asphalt and concrete surfaces.

The patch material composition of the present disclosure is applied and layered onto an asphalt and/or concrete surface with thicknesses from about 3.175 mm (0.125 in.) to about 63.5 mm (2.5 in.). When applying layers, up to 10% shrinkage and often 5% shrinkage occurs as the material cools from application temperature to ambient. The patch material composition generally sets without compaction. When applying the patch material composition in multiple layers (e.g., for discontinuities deeper than about 63.5 mm (2.5 in.)), each layer is cooled to less than or equal to about 90° C. (195° F.) before applying another layer. Layering and cooling the composite material during application mitigates and reduces shrinkage throughout the application process. Cooling time is dependent upon a variety of factors including ambient conditions and the size of the applied layer, but a cooling rate of about 100° C. (212° F.) per 30-60 minutes for a 25.4 mm (1 in.) thick layer of the patch material composition is often sufficient (e.g. a 50.8 mm (2 in.) thick layer of patch material should cool for about 1-2 hours). Further, in some aspects of the present disclosure, the last layer of the patch material composition applied to the asphalt or concrete surface is about 12.7 mm (0.5 in.) to about 25.4 (1 in.) thick. Following application, sufficient time for cooling and setting before allowing traffic on the asphalt or concrete surface is allowed.

The patch material composition can be used to seal cracks in asphalt and concrete ranging from in size (width) from less than 1 inch to greater than 24 inches. The patch material composition can also be used for sealing expansion joints, repairing longitudinal and traverse cracks, sealing joints between asphalt and concrete shoulders, repairs prior to surface treatment, sealing pavement joint separations, sealing spelled concrete joints, manhole repairs, repairing utility cuts, leveling depressed thermal cracks, leveling bridge deck approaches, leveling repairs, repairing potholes, and the like.

The patch material composition of the present disclosure is capable of remaining at application temperatures for up to 20 hours, with an alternate range of about 12 hours to about 15 hours at application temperatures. Application life is extendable by methods including adding fresh composite material as the quantity of composite material in the applicator decreases and agitating the patch material composition. Moreover, the patch material composition is capable of being reheated up to two times to application temperatures, following the initial heating to application temperature. After the third heating to application temperatures, material properties of the patch material composition may be reduced. For example, the patch material composition may become increasingly gelatinous, stringy, or viscous as application life is consumed; after which the remaining composite material is discarded.

When the installation process is to end for a period, the jacketed kettle should be greater than or equal to 75% empty of the patch material composition before cooling of the jacketed kettle. Also, when reheating a non-empty jacketed kettle, a quantity of the patch material composition greater than or equal to the amount of patch material composition remaining in the jacketed kettle during cooling thereof should be added to the jacketed kettle for the next installation.

Sealant Material Composition

In another form of the present disclosure, the material composition comprises a sealant (i.e., the sealant material composition) and includes at least five components; 1) an asphalt emulsion; 2) carbon black; 3) an aggregate; 4) a hydrophobic additive; and 5) a coalescent additive. In some aspects of the present disclosure the sealant material composition also includes a diluent to dilute the concentrate. In such aspects the sealant material composition is provided in a "ready-to-apply" form for an end-user.

In some aspects of the present disclosure the asphalt emulsion of the sealant material composition is a non-fiber asphalt emulsion. Non-fiber emulsions are typically used in connection with damp proofing, such as damp proofing exterior walls, roofs, and the like. Suitable non-fiber asphalt emulsions according to the present disclosure include asphalt base, clay emulsions that offer strength and water resistance. One suitable non-fiber asphalt emulsion is Dewitt's Pro Asphalt Emulsion Roof Coating, commercially available from Dewitt Products Company. Generally, the sealant material composition of the present disclosure may include a non-fiber asphalt emulsion in the range of about 20.0 wt. % to about 60.0 wt. %. In some aspects of the present disclosure, the sealant material composition includes a non-fiber asphalt emulsion in the range of about 30.0 wt. % to about 50.0 wt. %. In other aspects of the present disclosure, the patch material composition includes a non-fiber asphalt emulsion in the range between about 35.0 wt. % and about 45.0 wt. %. For example, sealant material compositions of the present disclosure have achieved desired material properties with a non-fiber asphalt emulsion of about 40.0 wt. % and about 40.3 wt. %.

Carbon black in the sealant material composition serves as a UV stabilizer. The carbon black may also serve as a coloring agent in that it aids (e.g., prevents or reduces) the sealant material composition from changing color (e.g., from black to gray) after being exposed to the sun. Generally, the sealant material composition of the present disclosure may include carbon black in the range of about 0.5 wt. % to about 5.0 wt. %. In some aspects of the present disclosure, the sealant material composition includes carbon black in the range of about 1.0 wt. % to about 4.0 wt. %. In other aspects of the present disclosure, the patch material composition includes carbon black in the range between about 1.5 wt. % and about 3.0 wt. %. For example, sealant material compositions of the present disclosure have achieved desired material properties with carbon black of about 2.0 wt. %.

A hydrophobic additive in the sealant material composition assists in providing a waterproof sealant. A suitable hydrophobic additive according to the present disclosure is "H2off," commercially available from Nanoprotech, Italy. Generally, the sealant material composition of the present disclosure may include a hydrophobic additive in the range of about 0.1 wt. % to about 1.0 wt. %. In some aspects of the present disclosure, the sealant material composition includes a hydrophobic additive in the range of about 0.25 wt. % to about 0.75 wt. %. In other aspects of the present disclosure, the patch material composition includes a hydrophobic additive in the range between about 0.4 wt. % and about 0.6 wt. %. For example, sealant material compositions of the present disclosure have achieved desired material properties with a hydrophobic additive of about 0.5 wt. %.

Aggregate in the sealant material composition serves as reinforcement to add strength to the asphalt or concrete being repaired. Generally, the sealant material composition of the present disclosure may include an aggregate, e.g., AAS, in the range of about 1.0 wt. % to about 10.0 wt. %. In some aspects of the present disclosure, the sealant material composition includes aggregate in the range between about 2.5 wt. % and about 7.5 wt. %. In other aspects of the present disclosure, the patch material composition includes an aggregate in the range between about 4.0 wt. % and about 6.0 wt. %. For example, sealant material compositions of the present disclosure have achieved desired material properties with an aggregate of about 5.0 wt. % and about 5.1 wt. %. In some aspects the sealant material composition is AAS in the form of powder. It should be understood AAS (pumice) is used instead of clay in the sealant material composition due to its increased hardness and reduced brittleness compared to clay.

Coalescents in the sealant material composition temporarily plasticize, reducing the glass transition temperature ($T_g$) of the sealant material below a drying temperature, enabling formation of the sealant material composition. Coalescents differ from plasticizers in that coalescents can evaporate allowing the $T_g$ of the sealant material composition recover to or above the drying temperature for application of the sealant material composition. Conversely, sufficient amount of plasticizer remains in the sealant material composition after drying such that the $T_g$ of the sealant material composition is lower than the drying temperature.

Before the sealant material composition is applied to a concrete or asphalt surface, the sealant material composition can be diluted. Dilution is accomplished by adding a diluent, such as water, to the sealant material composition. Generally, the amount of diluent added is in the range of about 25.0 wt. % to about 75.0 wt. %. That is, the sealant material composition described above can be considered a "concentrate" and the mixture of the concentrate and the diluent contains between about 25.0 wt. % to about 75.0 wt. % of the diluent. In some aspects of the present disclosure, the diluent is in the range of about 40.0 wt. % to about 60.0 wt. %. In other aspects of the present disclosure, diluent is in the range between about 45.0 wt. % and about 55.0 wt. %. For example, sealant material compositions of the present disclosure have achieved desired material properties with a diluent of about 52.0 wt. %.

Exemplary Application of the Sealant Material Composition

In some aspects of the present disclosure, the non-fiber asphalt emulsion, carbon black, hydrophobic additive, and coalescent are mixed together, such as in an asphalt mixer, for greater than or equal to about 30 minutes to form an intermediate concentrate. Then, the aggregate is added to the intermediate concentrate and mixed together for greater than or equal to about 30 minutes to form the concentrate. The concentrate may then be packaged and diluted at the time of application. In the alternative, the diluent may be added to the intermediate concentrate or the concentrate and provided in a ready-to-use form. The concentrate is stable and can be stored indefinitely.

The sealant material composition is generally flowable and can be applied to a concrete or asphalt surface to repair cracks in surfaces such as a driveway or a parking lot, among others, at thicknesses generally not greater than 1.6 mm (1/16 in.) The applied sealant material composition provides, when cured, a waterproof, durable, adhesive, flexible, non-slip surface offering excellent impact resistance and load-bearing characteristics.

The bond strength, durability, and other material properties of the sealant material composition of the present disclosure are influenced by several factors such as temperature, debris, and moisture. As such, a clean, dry and warm work area improves resultant material properties. A clean surface is as free as possible of any debris (e.g. dirt, dust, grease, loose materials) and any other material that could diminish bonding. Before application, noticeable recesses should be repaired.

Testing of the Sealant Material Composition

Several different asphalt emulsion-based pavement sealers (i.e., sealant material compositions) were compared against one another for physical properties (i.e. wt. % solids, wt. % ash, viscosity), as well as wear resistance on a scrub tester. Products evaluated included Comparison 1, Comparison 2, Comparison 3, and Exemplary Composition. The Exemplary Composition corresponds to one form of the sealant material composition according to the teachings of the present disclosure. Also, a refined coal tar-based pavement sealer was included (composition not shown in Table 2 below) for comparison in the scrub test. Table 2 below shows the wt. % solids, wt. % ash and viscosity of each of the asphalt emulsion-based pavement sealers.

TABLE 2

| Sample | Solids (wt. %) | Ash (wt. %) | Viscosity (CPs or mPa*s) |
|---|---|---|---|
| Comparison 1 | 38.2 | 39.2 | 3,670 |
| Comparison 2 | 42.7 | 39.6 | 3,820 |
| Comparison 3 | 31.5 | 23.2 | 2,280 |
| Exemplary Composition | 34.2 | 31.9 | 3,780 |

The sealant material compositions shown in Table 2 above and the refined coal tar-based pavement sealer were evaluated under a modified ASTM D2486 (scrub resistance for wall paints) to compare the durability of the different compositions. For scrub testing, sand in a quantity of 3 pounds per gallon (lb./gal) of sealant material composition was added to each composition and 30 thousandths of an inch (mil) wet coating was applied to a steel panel (multiple samples were run for each product). Samples were tested after a 2-day and a 7-day cure. Also, "1-cycle" was a single pass forward and back.

Figure 1B:
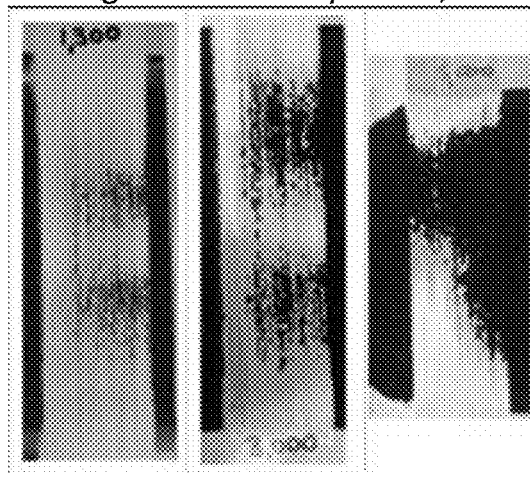
FIG. 1B is a series of photographs for steel panels coated with a Comparison 1 pavement sealer and subjected to scrub testing after a 2-day cure and a 7-day cure.
Figure 1B:
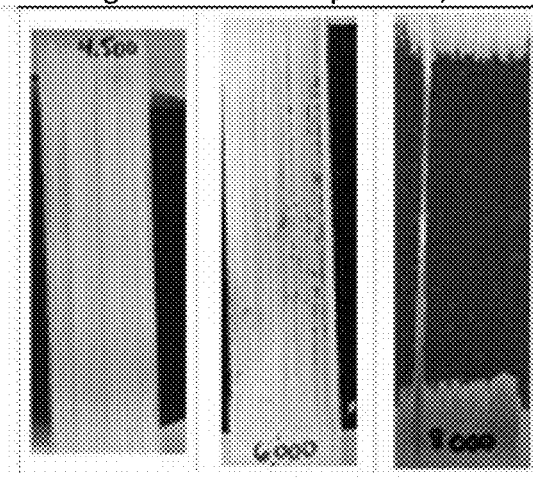
Figure 1C:
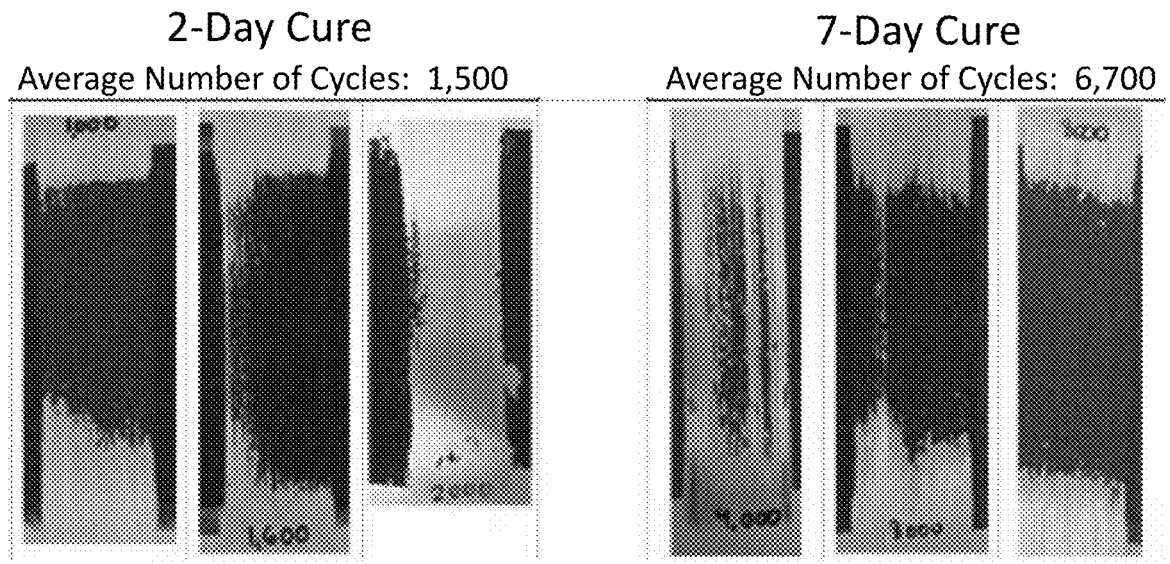
FIG. 1C is a series of photographs for steel panels coated with a Comparison 2 pavement sealer and subjected to scrub testing after a 2-day cure and a 7-day cure.
Figure 1D:
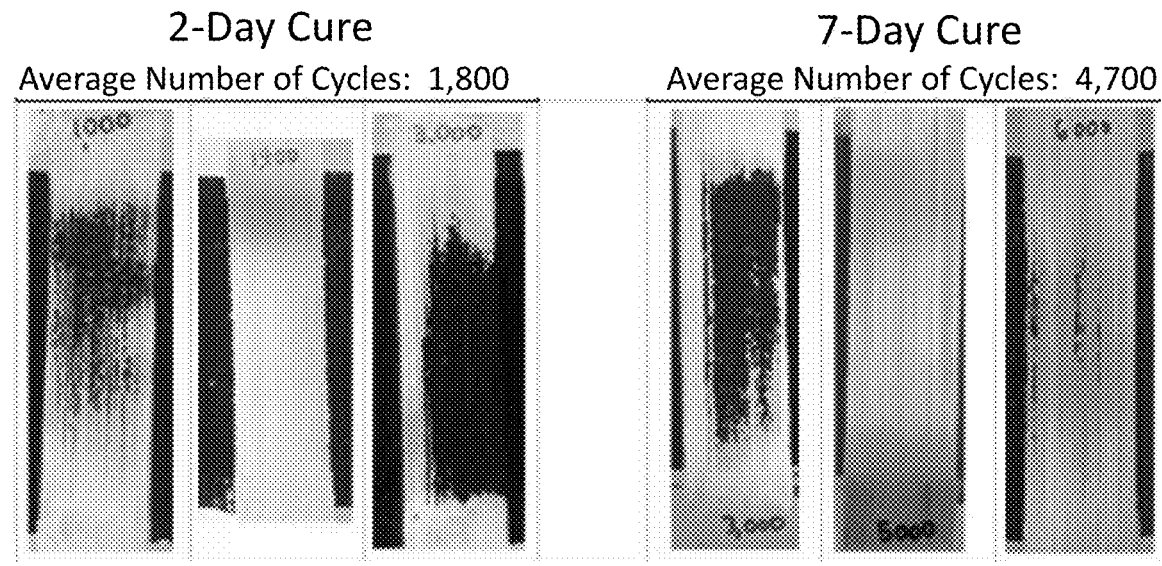
FIG. 1D is a series of photographs for steel panels coated with a Comparison 3 pavement sealer and subjected to scrub testing after a 2-day cure and a 7-day cure.
Figure 1E:
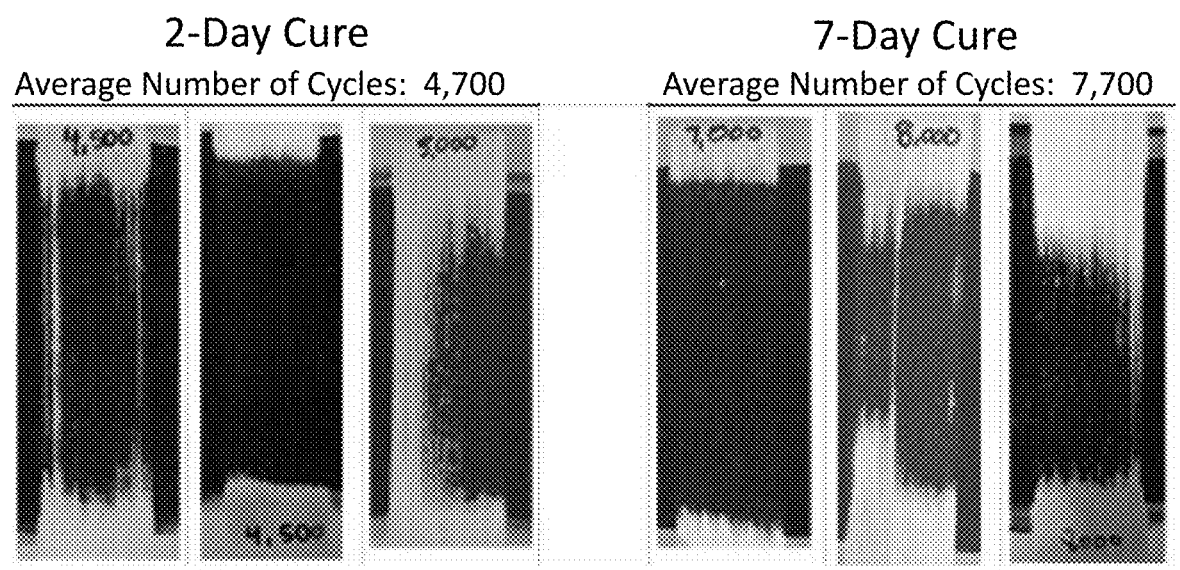
FIG. 1E is a series of photographs for steel panels coated with an Exemplary Composition pavement sealer and subjected to scrub testing after a 2-day cure and a 7-day cure.

Referring now to FIGS. 1A-1E photographs for the evaluated steel panels subjected to scrub testing after the 2-day cure and the 7-day cure are shown. The steel panels coated with the refined coal tar-based pavement sealer are shown in FIG. 1A, the steel panels coated with the Comparison 1 pavement sealer are shown in FIG. 1B, the steel panels coated with the Comparison 2 pavement sealer are shown in FIG. 1C, the steel panels coated with the Comparison 3 pavement sealer are shown in FIG. 1D, and the steel panels coated with the Exemplary Composition pavement sealer are shown in FIG. 1E. As shown in FIGS. 1B-1E, the Exemplary Composition pavement sealer outperformed the Comparison 1, Comparison 2, and Comparison 3 pavement sealers. Particularly, after the 2-day cure the Exemplary Composition pavement sealer exhibited an average of 4,700 cycles (per a scrub test failure criterion) compared to 3,100 cycles, 1,500 cycles, and 1,800 cycles for the Comparison 1, Comparison 2, and Comparison 3 pavement sealers, respectively. Accordingly, in some aspects of the present disclosure, the Exemplary Composition pavement sealer demonstrates greater than 50% improvement over compositions such as Comparison 1 pavement sealer, greater than 210% improvement over compositions such as Comparison 2 pavement sealer, and greater than 160% improvement over compositions such as Comparison 3 pavement sealer. In addition, the Exemplary Composition exhibited about 70% of the durability of the refined coal tar-based pavement sealer.

Spatially relative terms, such as "beneath," "below," "above," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sealant material composition for sealing asphalt or concrete comprising:
    a non-fiber asphalt emulsion between about 20.0 wt. % and about 60.0 wt. %;
    carbon black between about 0.5 wt. % and about 5.0 wt. %;
    an aggregate between about 1.0 wt. % and about 10.0 wt. %, wherein the aggregate consists essentially of amorphous aluminum silicate; and
    a hydrophobic additive between about 0.1 wt. % and about 1.0 wt. %.

2. The sealant material composition according to claim 1, wherein:
    the non-fiber asphalt emulsion is between about 30.0 wt. % and about 50.0 wt. %;
    the carbon black is between about 1.0 wt. % and about 4.0 wt. %;
    the aggregate is between about 2.5 wt. % and about 7.5 wt. %; and
    the hydrophobic additive is between about 0.25 wt. % and about 0.75 wt. %.

3. The sealant material composition according to claim 1, wherein:
the non-fiber asphalt emulsion is between about 35.0 wt. % and about 45.0 wt. %;
the carbon black is between about 1.5 wt. % and about 3.0 wt. %;
the aggregate is between about 4.0 wt. % and about 6.0 wt. %; and
the hydrophobic additive is between about 0.4 wt. % and about 0.6 wt. %.

4. The sealant material composition according to claim 1, wherein:
the non-fiber asphalt emulsion is about 40.0 wt. %;
the carbon black is about 2.0 wt. %;
the aggregate is about 5.0 wt. %; and
the hydrophobic additive is about 0.5 wt. %.

5. The sealant material composition according to claim 1 further comprising a diluent between about 25.0 wt. % and about 75.0 wt. %.

6. The sealant material composition according to claim 5, wherein the diluent is between about 40.0 wt. % and about 60.0 wt. %.

7. The sealant material composition according to claim 5, wherein the diluent is about 52.0 wt. %.

8. A sealant material composition for sealing asphalt or concrete comprising:
a non-fiber asphalt emulsion between about 20.0 wt. % and about 60.0 wt. %;
carbon black between about 0.5 wt. % and about 5.0 wt. %;
an aggregate between about 1.0 wt. % and about 10.0 wt. %, wherein the aggregate consists essentially of amorphous aluminum silicate; and
a coalescent between about 0.01 wt. % and about 0.5 wt. %.

9. The sealant material composition according to claim 8, wherein:
the non-fiber asphalt emulsion is between about 30.0 wt. % and about 50.0 wt. %;
the carbon black is between about 1.0 wt. % and about 4.0 wt. %;
the aggregate is between about 2.5 wt. % and about 7.5 wt. %; and
the coalescent is between about 0.05 wt. % and about 0.3 wt. %.

10. The sealant material composition according to claim 8, wherein:
the non-fiber asphalt emulsion is between about 35.0 wt. % and about 45.0 wt. %;
the carbon black is between about 1.5 wt. % and about 3.0 wt. %;
the aggregate is between about 4.0 wt. % and about 6.0 wt. %; and
the coalescent is between about 0.075 wt. % and about 0.2 wt. %.

11. The sealant material composition according to claim 8, wherein:
the non-fiber asphalt emulsion is about 40.0 wt. %;
the carbon black is about 2.0 wt. %;
the aggregate is about 5.0 wt. %; and
the coalescent is about 0.1 wt. %.

12. The sealant material composition according to claim 8 further comprising a diluent between about 25.0 wt. % and about 75.0 wt. %.

13. The sealant material composition according to claim 12, wherein the diluent is between about 40.0 wt. % and about 60.0 wt. %.

14. The sealant material composition according to claim 12, wherein the diluent is about 52.0 wt. %.

15. A sealant material composition for sealing asphalt or concrete comprising:
a non-fiber asphalt emulsion between about 20.0 wt. % and about 60.0 wt. %;
carbon black between about 0.5 wt. % and about 5.0 wt. %;
a hydrophobic additive between about 0.1 wt. % and about 1.0 wt. %; and
a coalescent between about 0.01 wt. % and about 0.5 wt. %.

16. The sealant material composition according to claim 15, wherein:
the non-fiber asphalt emulsion is between about 30.0 wt. % and about 50.0 wt. %;
the carbon black is between about 1.0 wt. % and about 4.0 wt. %;
the hydrophobic additive is between about 0.25 wt. % and about 0.75 wt. %; and
the coalescent is between about 0.05 wt. % and about 0.3 wt. %.

17. The sealant material composition according to claim 15, wherein:
the non-fiber asphalt emulsion is between about 35.0 wt. % and about 45.0 wt. %;
the carbon black is between about 1.5 wt. % and about 3.0 wt. %;
the hydrophobic additive is between about 0.4 wt. % and about 0.6 wt. %; and
the coalescent is between about 0.075 wt. % and about 0.2 wt. %.

18. The sealant material composition according to claim 15, wherein:
the non-fiber asphalt emulsion is about 40.0 wt. %;
the carbon black is about 2.0 wt. %;
the hydrophobic additive is about 0.5 wt. %; and
the coalescent is about 0.1 wt. %.

19. The sealant material composition according to claim 15 further comprising a diluent between about 25.0 wt. % and about 75.0 wt. %.

20. The sealant material composition according to claim 19, wherein the diluent is about 52.0 wt. %.

* * * * *